B. B. WATERMAN.
MACHINE FOR MAKING PLUG BLANKS.
APPLICATION FILED NOV. 7, 1913.

1,198,797.

Patented Sept. 19, 1916.
5 SHEETS—SHEET 1.

Witnesses.
Franklin E. Low.
Leonard A. Powell.

Inventor:
Bradford B. Waterman,
by his attorney,
Charles N. Gooding.

B. B. WATERMAN.
MACHINE FOR MAKING PLUG BLANKS.
APPLICATION FILED NOV. 7, 1913.
1,198,797.
Patented Sept. 19, 1916.
5 SHEETS—SHEET 2.
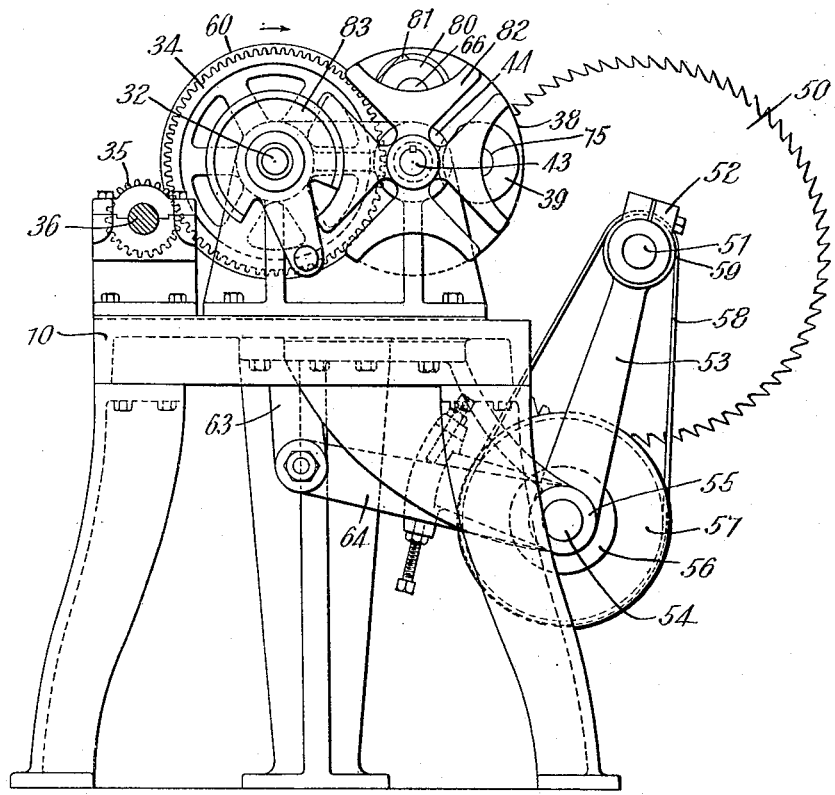
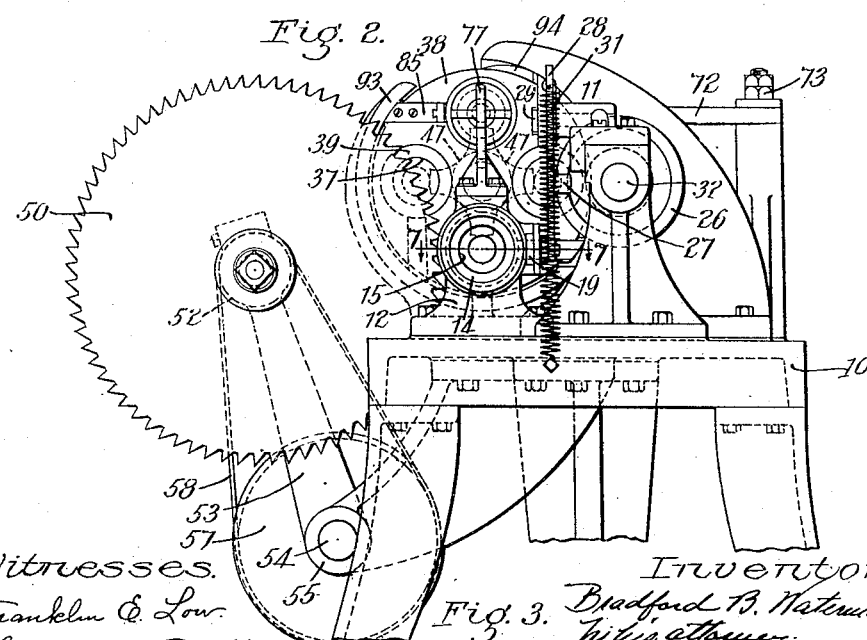
Fig. 2.
Fig. 3.
Witnesses.
Franklin E. Low.
Leonard A. Powell.
Inventor.
Bradford B. Waterman,
by his attorney
Charles S. Gooding.

B. B. WATERMAN.
MACHINE FOR MAKING PLUG BLANKS.
APPLICATION FILED NOV. 7, 1913.

1,198,797.

Patented Sept. 19, 1916.
5 SHEETS—SHEET 3.

Witnesses
Franklin E. Low
Leonard A. Powell

Inventor
Bradford B. Waterman,
by his attorney
Charles V. Gooding.

B. B. WATERMAN.
MACHINE FOR MAKING PLUG BLANKS.
APPLICATION FILED NOV. 7, 1913.

1,198,797.

Patented Sept. 19, 1916.
5 SHEETS—SHEET 4.

Witnesses.
Franklin E. Low.
Leonard A. Powell.

Inventor:
Bradford B. Waterman,
by his attorney, Charles S. Gooding.

B. B. WATERMAN.
MACHINE FOR MAKING PLUG BLANKS.
APPLICATION FILED NOV. 7, 1913.

1,198,797.

Patented Sept. 19, 1916.
5 SHEETS—SHEET 5.

UNITED STATES PATENT OFFICE.

BRADFORD B. WATERMAN, OF EAST BRIDGEWATER, MASSACHUSETTS, ASSIGNOR TO THE AMERICAN SHOE FINDING COMPANY, A CORPORATION OF MAINE.

MACHINE FOR MAKING PLUG-BLANKS.

1,198,797.  Specification of Letters Patent.  Patented Sept. 19, 1916.

Application filed November 7, 1913. Serial No. 799,805.

*To all whom it may concern:*

Be it known that I, BRADFORD B. WATERMAN, a citizen of the United States, residing at East Bridgewater, in the county of Plymouth and State of Massachusetts, have invented new and useful Improvements in Machines for Making Plug-Blanks, of which the following is a specification.

This invention relates to machines for making plug blanks.

The object of the invention is to provide a machine adapted to feed stock, which may be of green wood, fiber or like material, cut off a predetermined portion of said stock, bore a hole through said cut off portion and finally eject said cut off and bored portion therefrom.

The invention consists in the combination and arrangement of parts whereby the above object and certain other objects hereinafter appearing may be attained, as set forth in the following specification and particularly pointed out in the claims.

Figure 1:
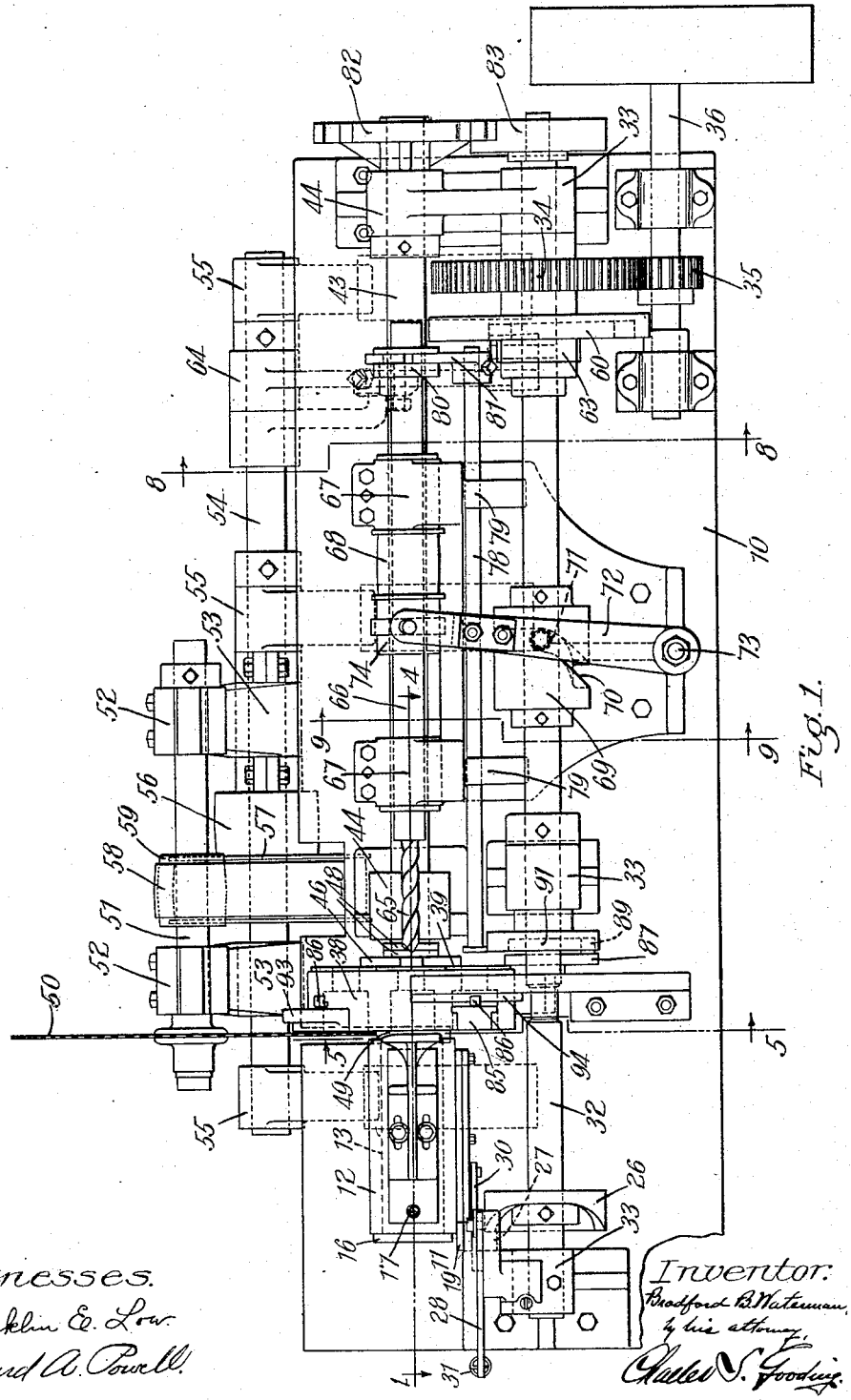
Figure 4:
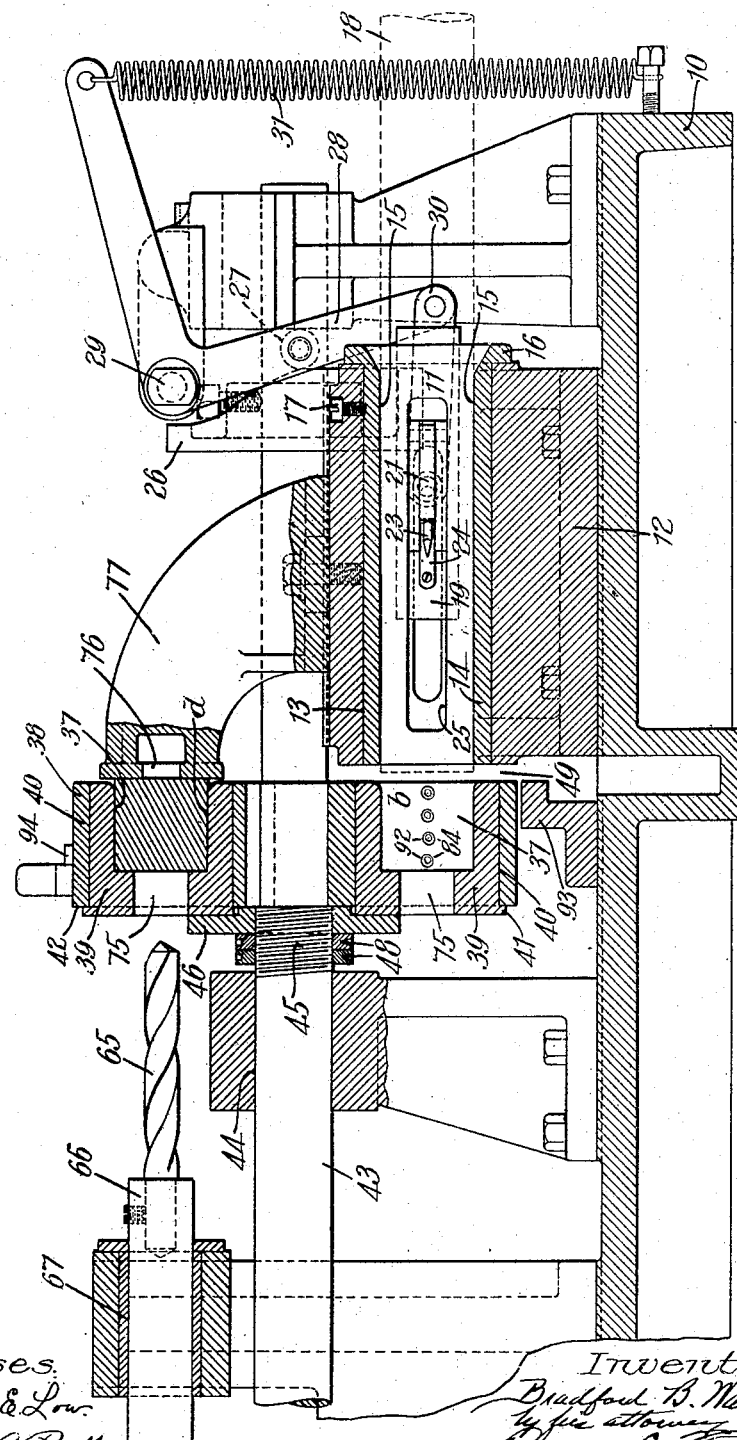
Figure 5:
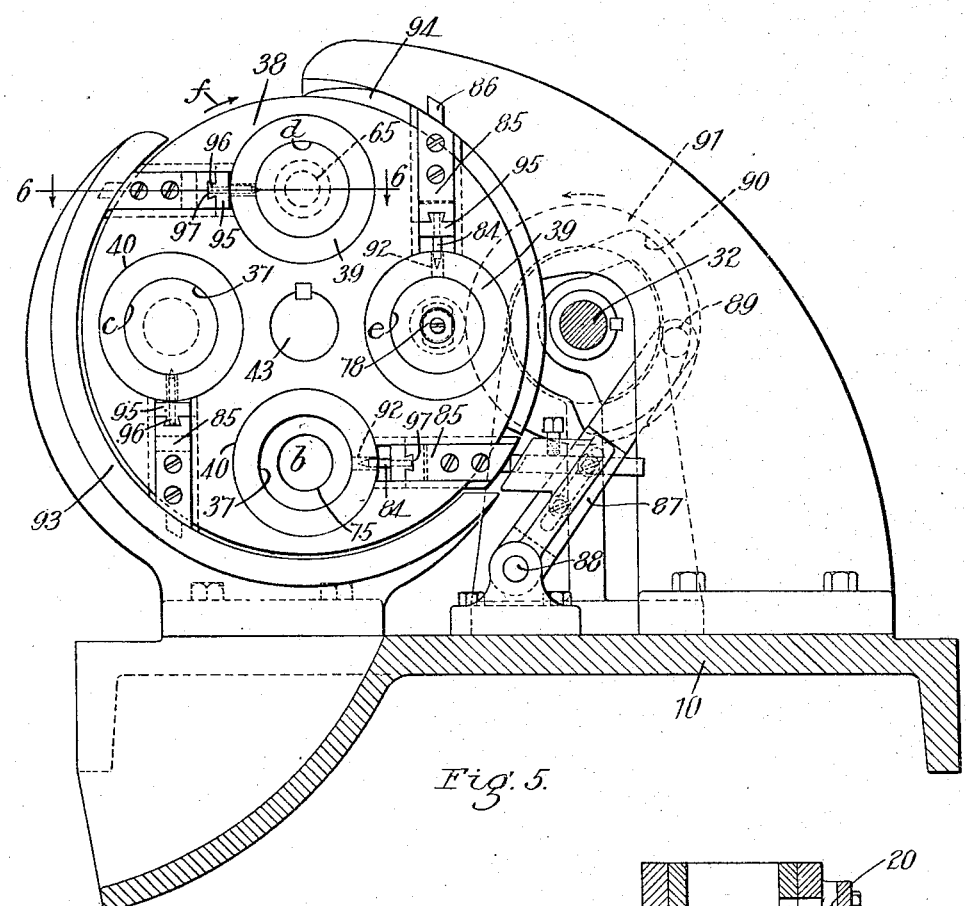
Figure 6:
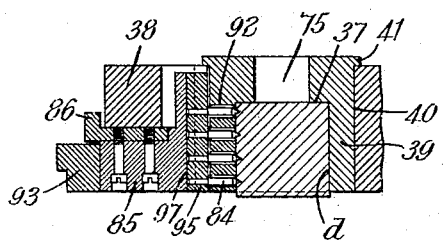
Figure 7:
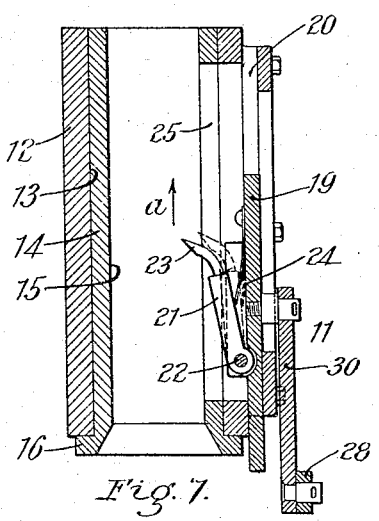
Figure 8:
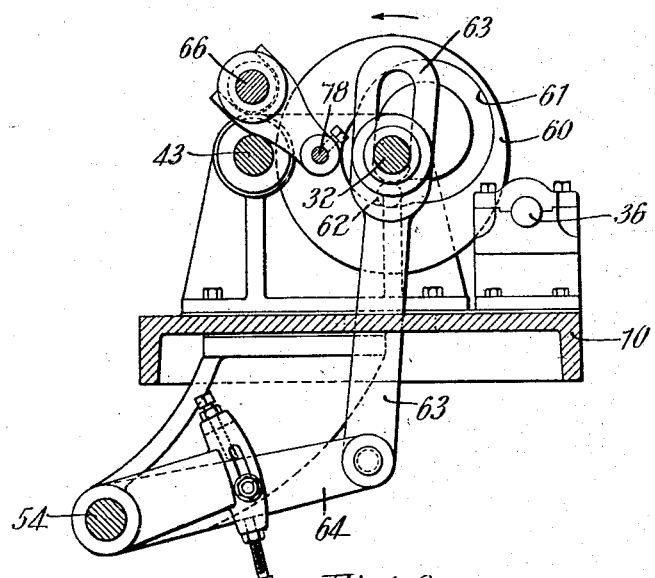
Figure 9:
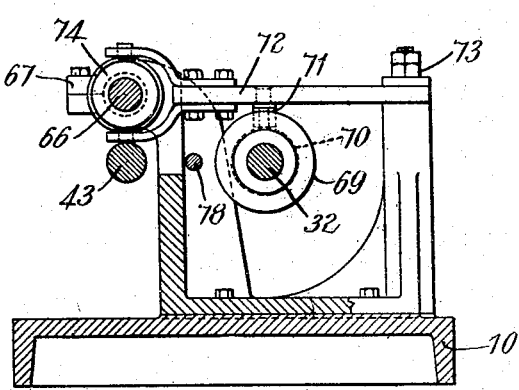

Referring to the drawings: Figure 1 is a plan view of a machine embodying my invention. Fig. 2 is a right-hand end elevation of the machine illustrated in Fig. 1. Fig. 3 is a left-hand end elevation of said machine, portions of the frame being broken away to save space in the drawings. Fig. 4 is a detail sectional elevation taken on line 4—4 of Fig. 1, as viewed in the direction of the arrows on said line. Fig. 5 is a sectional elevation taken on line 5—5 of Fig. 1. Fig. 6 is a detail sectional view taken on line 6—6 of Fig. 5 illustrating one of the pockets in the stock carrier with the spurs or gripping device shown in connection therewith. Fig. 7 is a plan section taken on line 7—7 of Fig. 3 illustrating the stock guiding sleeve and feeding means. Fig. 8 is a transverse sectional elevation taken on line 8—8 of Fig. 1 illustrating the saw actuating lever and cam. Fig. 9 is a transverse sectional elevation taken on line 9—9 of Fig. 1 illustrating the cam and cam lever adapted to reciprocate the boring and ejecting tools.

Like numerals refer to like parts throughout the several views of the drawings.

In the drawings, 10 is the frame upon which the various mechanisms composing the machine are mounted. The stock feeding mechanism 11, which constitutes one of the aforesaid, preferably consists of a bracket 12 having a hole 13 extending longitudinally therethrough and adapted to contain a detachable sleeve 14 provided with a passage 15 extending the entire length thereof. Said sleeve has a flange 16 at the outer end thereof which engages the end of the bracket 12, thus limiting the movement of said sleeve in one direction, a screw 17 being provided to secure said sleeve in place. The stock 18, which is represented by dotted lines in Fig. 4, may vary in size and in cross sectional conformation. Said stock is adapted to be guided through the passage 15 in said bushing and to substantially fit the same.

In order to adapt the machine to substantially any shape of stock the hole 13 in the bracket 12 is made larger in diameter than the largest of the stock and permits a bushing having a passage 15 of the size suitable to contain said large sized stock, while for smaller stock the hole in said bushing may be correspondingly smaller.

The slide 19 is arranged to reciprocate in guides 20 in the bracket 12. A feed finger 21 is pivoted at 22 to the inner face of said slide, the free end 23 of said finger being pointed. A spring 24 engages said feed finger and normally retains said finger point within the passage 15, said finger projecting through a slot 25 arranged longitudinally of the sleeve 14. The feed finger 21 is inclined toward the inner end of said sleeve 14 thereby permitting the stock to be easily inserted in said sleeve, but absolutely preventing the withdrawal thereof without first moving said feed finger out of contact therewith; thus when the slide 19 is moved along the guides 20, in the direction of the arrow "*a*", the pressure of the spring 24 against said feed finger will cause the point 23 thereof to pierce the stock and feed the same through said bushing, but when said slide is retracted said point will merely slide along the surface of said stock without moving the same. A sliding motion is imparted to the slide 19 in one direction during certain times in the operation of the machine by a cam 26 which is engaged by a cam roll 27 upon a lever 28, in turn pivoted at 29 to a portion of the frame 10, the lever 28 being connected to the slide 19 by a link 30. The cam 26 is an open cam and therefore requires the coöperation of a spring 31 to retain the cam roll 27 in contact therewith and to move said slide 19 in the opposite direction. In the present instance said cam is arranged in such a manner that it retracts the slide 19, while said spring 31 moves said slide in the direction of said arrow "a", thus yieldingly moving said slide in that direction. The throw of said cam however is sufficient to move the stock 18 the maximum distance, which distance is equal to the longest blank required.

The cam 26 is mounted upon a shaft 32 journaled to rotate in bearings 33 which form a part of the frame 10. A continuous rotary motion is imparted to the shaft 32 through a gear 34 which meshes with a gear 35 fast to a driving shaft 36 of the machine, said driving shaft being journaled in suitable bearings on the frame 10.

As the stock is fed through the sleeve 14 it enters a pocket 37 in alinement with the passage 15, said pocket being one of a plurality of pockets arranged about the axis of a rotary member 38. The dimensions of said pockets are in accordance with the desired dimensions of the blanks which are to be formed in said machine, the same being shallow or deep according to the length desired for said blank, while the diameters of said pockets correspond to the diameter of the passage 15. It is therefore essential that said pockets be detachably mounted relatively to the carrier 38 and in the carrying out of this feature of the machine bushings 39 are provided, which are recessed to form the pockets 37 and fit holes 40 extending through said rotary member in a direction parallel with the axis thereof. Said bushings are provided with flanges 41 which engage the face 42 of said rotary member and position said bushings relatively to said member in one direction. The member 38 is mounted upon the end of a shaft 43 journaled to rotate in bearings 44 constituting a part of the frame 10. The shaft 43 is screw-threaded at 45 adjacent the face 42 of said rotary member and engaging said threads is a key 46, preferably disk shaped, and overlaps all of the holes 40 in said member. Notches 47 are provided in said disk which correspond with the flanges 41 on the bushings 39. Upon the rotation of said key 46 to bring said notches in alinement with said bushings all of said bushings may be withdrawn from their respective holes, but when said key is rotated and said notches are moved out of alinement with said bushings, said bushings will be simultaneously locked within their respective holes. Check nuts 48 are provided by means of which said key may be secured in said latter position.

A gap 49 is provided between the end of the sleeve 14 and the adjacent end of the bushing 39 alining therewith, which for the purpose of differentiation occupies the position indicated at "b", while through said gap means are introduced after the stock has been inserted in the pockets 37, to cut off the portion of stock contained in said pocket. To accomplish the cutting off of said stock I have provided a cutting mechanism, which may be better understood by referring to Figs. 1, 2, 3 and 8, and preferably consisting of a rotary saw 50 secured to a shaft 51 journaled in bearings 52, upon a rocker frame 53, said frame being carried by a shaft 54, which in turn is adapted to rock in bearings 55 constituting part of the frame 10. A rotary motion is imparted to said saw by a pulley 56 which is loosely mounted on the shaft 54 and driven from any suitable source of power. Secured to said pulley 56 is a pulley 57, said pulley being connected by a belt 58 to a smaller pulley 59 secured to the shaft 51. At certain times in the operation of the machine said saw, which is normally retained out of the path of the advancing stock 18, is swung inwardly transversely of the face of said rotary member 38 and cuts off the portion of the stock contained in the pocket at "b". This movement of said saw is preferably accomplished by a cam 60 secured to the shaft 32 and provided with a cam groove 61 within which is arranged a cam roll 62 mounted upon a link 63, which spans at one end the shaft 32 and at its opposite end pivotally engages a lever 64, said lever being adjustably connected with the rocker shaft 54, thus as said shaft 32 is rotated said cam reciprocates the link 63 and rocks said shaft 54, whereby said saw is moved transversely of the face of said rotary member as stated.

Arranged adjacent to the rotary member 38 and in alinement with one of said pockets, preferably the pocket at "d" and upon the opposite side of said carrier from said stock feeding means are means adapted to bore holes in the stock contained in said pocket, said means consisting of a boring tool 65 secured to the end of a shaft 66, which is journaled to rotate and reciprocate in bearings 67. A pulley 68 fast to said shaft is rotated from any suitable source of power, not shown, whereby to impart a rotary motion to said boring tool.

To reciprocate the boring tool 65 means are provided which preferably consist of a cam 69 fast to the shaft 32 and provided with a cam groove 70 within which is arranged a cam roll 71 fast to a lever 72 pivoted at 73 and operatively engaging a collar 74 fast to the shaft 66.

The boring tool 65, when reciprocated by the mechanism hereinbefore described, enters a hole 75 in the bushing 39, said hole being of smaller diameter than said pocket 37 and extending from the bottom of said pocket to the opposite end of said bushing or that end at which the flange 41 is located.

As said tool enters said hole it engages the cut off portion of the stock which is contained in the pocket, said boring tool passing through said stock and into a recess 76 formed in a support 77 which is arranged adjacent to and in front of the pocket located at "*d*" for the purpose of supporting the stock while the same is being bored.

Arranged adjacent to one of the pockets in said rotary member, preferably the pocket located at "*e*", are means adapted to eject the stock from said pocket, said means including a rod 78 arranged to be reciprocated in bearings 79 by the shaft 66 through the instrumentalities of a collar 80 fast to said shaft 66 which is operatively engaged by an arm 81 fast to said rod. Thus as the stock contained in the pocket at "*d*" is being bored the stock contained in the pocket at "*e*" is simultaneously being ejected and indirectly by means of the cam 69 and lever 72.

The rotary member 38 with its plurality of pockets 37 arranged about its axis constitutes a carrier for the stock, said stock being first fed to the lowermost pocket positioned at "*b*", cut off and thence carried around in the direction of the arrows "*f*" to the boring instrumentalities positioned at "*d*", thence from said position to the position "*e*" in alinement with the ejecting means by which the stock contained in said pockets will be ejected. Each of the pockets at "*b*", "*e*", "*d*" and "*c*" are successively presented to each of said mechanisms to be operated upon. To provide time for each of said mechanisms to complete their operations said carrier is rotated by intermittent gears consisting of a driven member 82 secured to the end of the shaft 43 and a driving member 83 fast to the shaft 32, said intermittent gears adapted to rotate said carrier for a portion of a rotation and lock the same in that position.

After the stock has been fed to the pocket at "*b*" it is essential that the stock contained in said pocket be securely gripped and held during the cutting off operation at which time the feeding mechanism is being retracted. To accomplish this a series of spurs 84 are arranged adjacent each of the bushings 39, upon slides 85 adapted to be reciprocated in the rotary member 38 radially relatively to their respective bushings. The slide for the bushing at "*b*", when said bushing first arrives in said position and before the feeding of the stock takes place, occupies the position illustrated in Fig. 5 slightly projecting beyond the periphery of the carrier 38. A lug 86 is secured to said slide and is adapted, when in the position hereinbefore mentioned, to be engaged by a lever 87 pivoted at 88. A cam roll 89 on said lever projects into a cam groove 90 in the face of a cam 91, said cam being secured to the shaft 32. At the proper times in the operation of the machine, or particularly immediately after the stock has been fed to the pocket at "*b*", said cam operates to rock said lever 87 and thereby move the slide 85 for said pocket and by so doing the spurs 84 carried by said slide are moved longitudinally of the holes 92 in said bushing causing the points of said spurs to engage the stock. The mechanism just described is merely for the purpose of moving the spurs into engagement with the stock contained in the pocket at "*b*", but as the carrier or rotary member 38 is rotated said slide 85 is moved out of engagement with the lever 87 and to retain said slide with its spurs in contact with the stock a guard 93 is disposed adjacent to the periphery of said rotary member for a substantial distance therearound and is adapted to engage the outer end of the slide 85 just as said slide is moving from its position in contact with the lever 87. Said guard is adapted to engage said slide until the same has passed beyond the position "*d*", which is the boring position of said carrier. From said position "*d*" and before the carrier has moved to the position "*e*" it is necessary to retract said spurs in order to free the stock contained in said bushing so that the ejecting means may act thereupon. For this purpose a cam 94 has been provided adjacent the periphery of said rotary member to engage the lug 86 during the rotation of said carrier and retract said slide, said cam terminating just before the slide arrives at the position "*b*" and thereby freeing said slide to permit the same to be operated upon by the lever 87.

The drawings illustrate a bushing having a pocket of medium depth. When a pocket of greater or less depth is required the number of spurs 84, or the positions thereof must necessarily be changed to correspond with said depth of pocket and in order to facilitate the removal and the changing of said spurs a supplementary slide 95 has been provided to which the spurs are secured, preferably by riveting.

The supplementary slide 95 is detachably secured to the slide 85 by a tongue 96 adapted to engage a groove 97 and as the bushing 39 is removed said slide 95 will also be removed thereby, owing to the engagement of the spurs 84 with the several holes 92 and when a new bushing is inserted in the hole 40 a slide 95 with spurs to correspond with said bushing will simultaneously be inserted therewith.

The general operation of the device hereinbefore specifically described is as follows: The stock is inserted in the passage 15 of the sleeve 14 and as the feed slide 19 moves forward said stock is inserted into the pocket 37 occupying the position "*b*". Should said pocket be of maximum depth said slide will move the entire throw, but should said pocket be of less depth said feed slide will be moved by the spring 31 until the end of the stock engages the end of said pocket, whereupon said slide will be stopped permitting the cam to continue to rotate until the next rise approaches to retract said slide. The gripping means are then operated to grip the end of said stock contained in said pocket after which the cutting instrumentalities are brought into play to cut off the portion of said stock contained in said pocket. The carrier or rotary member 8 is then rotated for a quarter of a turn to bring the next successive bushing, which occupies the position "$e$" into the position "$b$", to be acted upon in a like manner and so on each successive bushing is presented to the stock feeding means and receives a portion of said stock. As said carrier continues to intermittently move the bushings containing said stock after leaving said stock feeding instrumentalities, they are presented successively to the boring means and the ejecting means respectively just as long as the machine is continued in operation and stock fed to the sleeve 14.

Having thus described my invention what I claim and desire by Letters Patent to secure is:

1. In a machine of the class described, a rotary member, provided with a plurality of holes extending in a direction parallel with the axis of said member, bushings adapted to fit said holes, said bushings each having pockets extending for a predetermined distance thereinto adapted to contain stock, a key member coaxially mounted with said rotary member, constructed and arranged to retain said bushings within their respective holes, said key member having notches in its edge adapted to be moved to aline with said bushings and permit said bushings to be withdrawn from said holes, and means to lock said key member to said rotary member so as to prevent the withdrawal of said bushings from said holes.

2. In a machine of the class described a rotary member provided with a plurality of holes extending in a direction parallel with the axis of said member, bushings adapted to fit said holes, said bushings each having pockets extending for a predetermined distance thereinto and adapted to contain stock, a key disk axially mounted relatively to said rotary member to engage said bushings and retain them within said holes, said disk having notches in its edge adapted to be moved to aline with said bushings and permit said bushings to be withdrawn from said holes, and means to lock said disk to said rotary member and in contact with said bushings.

3. A machine of the class described having, in combination, a carrier provided with a pocket, a detachable bushing for said pocket having a hole adapted to contain stock of a predetermined size, a slide mounted in said carrier adjacent said pocket, a spur detachably mounted on said slide and arranged to project through said bushing into the stock contained therein, said spur being arranged to be withdrawn from said slide by the removal of said bushing from said carrier, and means to operate said slide to grip or release the stock.

4. A machine of the class described having, in combination, a carrier provided with a pocket, a detachable bushing for said pocket having a hole adapted to contain stock of a predetermined size, a slide arranged to move laterally relatively to said bushing, a supplementary slide on said slide movable transversely thereof and longitudinally of said bushing, a spur carried by said supplementary slide adapted to project through said bushing and into the stock, and means to operate said slide to grip and release said stock.

In testimony whereof I have hereunto set my hand in presence of two subscribing witnesses.

BRADFORD B. WATERMAN.

Witnesses:
CHARLES L. REDDING,
JOHN M. TYLER.

Copies of this patent may be obtained for five cents each, by addressing the "Commissioner of Patents. Washington, D. C."